S. W. DUDLEY.
BRAKE VALVE DEVICE.
APPLICATION FILED MAY 13, 1919.
1,414,807.
Patented May 2, 1922.
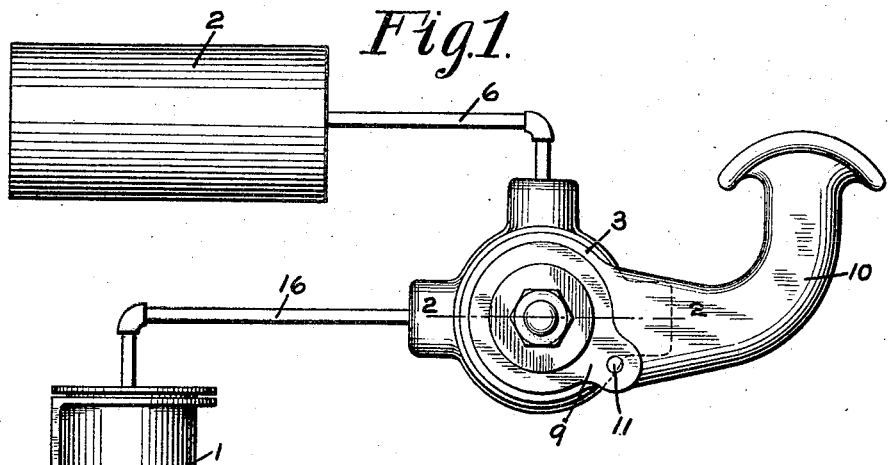
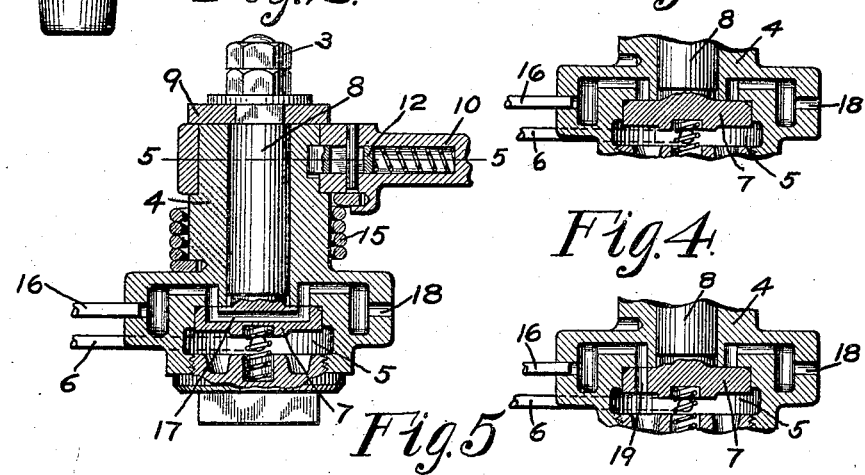
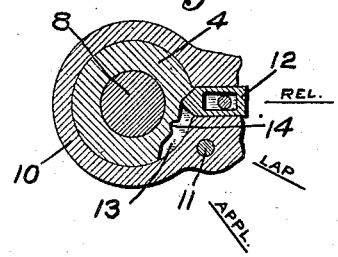
INVENTOR
Samuel W. Dudley
by Wm. M. Cady
Att'y.

UNITED STATES PATENT OFFICE.

SAMUEL W. DUDLEY, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

BRAKE-VALVE DEVICE.

1,414,807. Specification of Letters Patent. Patented May 2, 1922.

Application filed May 13, 1919. Serial No. 296,861.

*To all whom it may concern:*

Be it known that I, SAMUEL W. DUDLEY, a citizen of the United States, residing at Edgewood, in the county of Allegheny and State of Pennsylvania, have invented new and useful Improvements in Brake-Valve Devices, of which the following is a specification.

This invention relates to brakes, and more particularly to a brake adapted for motor vehicles.

The usual foot operated brake as applied to motor vehicles, while adapted to be quickly operated does not have high braking power. On the other hand, the hand or emergency brake, while giving a higher braking power, is comparatively slow to operate.

The principal object of my invention is to provide a fluid pressure brake for motor vehicles which will provide a high braking power and is adapted to be quickly and promptly operated by foot power.

In the accompanying drawing, Fig. 1 is a diagrammatic view of a fluid pressure brake apparatus for a motor vehicle, embodying my invention; Fig. 2 a section on the line 2—2 of Fig. 1; Fig. 3 a fragmentary section of the foot controlled valve, shown in Fig. 2, with the valve in lap position; Fig. 4 a similar view, showing the valve in brake application position; and Fig. 5 a section on the line 5—5 of Fig. 2.

As shown in the drawing, the construction may comprise a brake cylinder 1 for applying the brakes on the motor vehicle by a fluid pressure, a reservoir 2, adapted to be maintained charged with fluid under pressure, and a foot operated valve device 3 for controlling the admission of fluid from reservoir 2 to the brake cylinder 1 and the release of fluid from said brake cylinder.

The foot operated valve device 3 may comprise a body 4 having a valve chamber 5, connected by pipe 6 to reservoir 2, and containing a rotary slide valve 7, a valve stem 8 for operating the valve 7, a plate 9 secured to said stem, and a foot operated lever 10, rotatably mounted on the body 4 and connected to the plate 9 by a pin 11, so that the movement of the lever 10 is adapted to rotate the valve 7.

The valve 7 has three positions; release, lap, and application; and a coil spring 15, mounted on and having one end secured to the body 4, has its other end secured to the lever 10 and is so wound that the spring tends to throw the foot lever 10 with the valve 7 to release position.

A spring stop 12 is mounted within the lever 10 and is adapted to engage within a groove 13 formed in the body 4. One end of the groove 13 acts as a limit for the stop 12 to define the release position, the other end as a limit to define the application position, and intermediate the ends, there is a notch 14 with which the stop 12 may engage to define the lap position.

In operation, the foot lever is normally held in release position, as shown in Fig. 1, by the action of the spring 15, in which position, pipe 16, leading to the brake cylinder 1, is connected through a cavity 17 in the rotary valve 7 with an exhaust port 18.

If it is desired to apply the brakes, the foot lever 10 is depressed until the spring stop 12 engages the opposite end of the notch 13, and this operates to rotate the valve 7 to the position shown in Fig. 4 of the drawing, in which the brake cylinder pipe 16 is connected to a through port 19 in the rotary valve 7, so that fluid under pressure is supplied from the valve chamber 5 and the reservoir 2 to the brake cylinder 1.

When the desired brake application is obtained, the brakes may be released by removing the foot from the lever 10, so as to permit the parts to be returned to release position by the action of the spring 15, or the brakes may be held applied by lifting the foot until the spring stop 12 engages the notch 14, which can be felt by the operator as he raises his foot.

In lap position, as shown in Fig. 3, the communication to the brake cylinder 1 is closed, so that the fluid under pressure in the brake cylinder may be held there as long as desired, provided the operator holds his foot on the lever 10 to maintain the lever in lap position.

Having now described my invention, what I claim as new, and desire to secure by Letters Patent, is:—

In a fluid pressure brake for motor vehicles, the combination with a brake cylinder and a source of fluid under pressure, of a valve having positions for supplying and releasing fluid to and from the brake cylinder, and an intermediate lap position, a foot operated lever for operating said valve, a spring tending to return said valve and lever to release position, and means for defining the lap position.

In testimony whereof I have hereunto set my hand.

SAMUEL W. DUDLEY.